United States Patent
Segev et al.

(10) Patent No.: US 9,612,124 B2
(45) Date of Patent: Apr. 4, 2017

(54) NAVIGATION SYSTEM AND METHOD WITH LOCATION-AWARE ACCURACY AND/OR POWER ADJUSTMENTS

(71) Applicant: INTEL CORPORATION, Santa Clara, CA (US)

(72) Inventors: Jonathan Segev, Tel Mond (IL); Ehud Reshef, Kiryat Tivon (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/126,856

(22) PCT Filed: Nov. 16, 2012

(86) PCT No.: PCT/US2012/065641
§ 371 (c)(1),
(2) Date: Dec. 17, 2013

(87) PCT Pub. No.: WO2013/075004
PCT Pub. Date: May 23, 2013

(65) Prior Publication Data
US 2014/0214314 A1    Jul. 31, 2014

(30) Foreign Application Priority Data
Nov. 20, 2011   (IL) .......................................... 216475

(51) Int. Cl.
*G01C 21/34* (2006.01)
*G01S 19/34* (2010.01)
(Continued)

(52) U.S. Cl.
CPC ............... *G01C 21/34* (2013.01); *G01S 19/34* (2013.01); *G01S 19/42* (2013.01); *G01S 19/47* (2013.01); *G01S 19/52* (2013.01)

(58) Field of Classification Search
CPC .................................. G01C 21/34; G01S 19/42
(Continued)

(56) References Cited

U.S. PATENT DOCUMENTS

| 7,359,713 B1 * | 4/2008 | Tiwari .................... G01S 19/34 342/105 |
| 2007/0202838 A1 | 8/2007 | Zancola et al. |

(Continued)

OTHER PUBLICATIONS

International Preliminary Report on Patentability and Written Opinion received for PCT Patent Application No. PCT/US2012/065641, mailed on May 30, 2014, 8 pages.
(Continued)

*Primary Examiner* — Yazan Soofi
(74) *Attorney, Agent, or Firm* — Grossman, Tucker, Perreault & Pfleger, PLLC

(57) ABSTRACT

In a navigation system and method, location-aware adjustments may be made to the accuracy and/or power of the navigation system by changing at least one setting of a navigation system receiver in response to at least one characteristic of a navigation route and/or an estimated current position of the receiver. By providing location-aware adjustments, the accuracy may be increased when a higher accuracy is desired and may be decreased when a lower accuracy is sufficient based on the receiver location. A higher accuracy setting may be used, for example, when the estimated current position of a navigation system receiver is within the vicinity of a waypoint along the navigation route and a lower accuracy setting may be used at other times to reduce power consumption. Of course, many alternatives, variations, and modifications are possible without departing from this embodiment.

22 Claims, 6 Drawing Sheets

(51) Int. Cl.
*G01S 19/52* (2010.01)
*G01S 19/47* (2010.01)
*G01S 19/42* (2010.01)

(58) Field of Classification Search
USPC .............................. 701/410, 408, 467, 468
See application file for complete search history.

(56) References Cited

U.S. PATENT DOCUMENTS

| | | | |
|---|---|---|---|
| 2008/0012761 A1* | 1/2008 | Derrick et al. | 342/357.07 |
| 2008/0091351 A1 | 4/2008 | Hoshizaki | |
| 2008/0200180 A1 | 8/2008 | Dunn | |
| 2011/0050503 A1* | 3/2011 | Fong | G01C 21/26 342/451 |
| 2011/0070896 A1* | 3/2011 | Persico | 455/456.1 |
| 2011/0288766 A1* | 11/2011 | Nagasawa et al. | 701/201 |
| 2011/0307173 A1* | 12/2011 | Riley | G01C 21/165 701/510 |

OTHER PUBLICATIONS

International Search Report and Written Opinion received for PCT Patent Application No. PCT/US2012/065641, mailed on Mar. 29, 2013, 12 Pages.
Office Action received for Israel Patent Application No. 216475, mailed on Sep. 17, 2015, 2 pages of English translation and 3 pages of Israeli Office Action.
Office Action received for Chinese Patent Application No. 201280056984.4, mailed on Jan. 4, 2016, 8 pages of English translation and 5 pages of Chinese Office Action.
Search Report of the State Intellectual Property Office of People's Republic China for Chinese Application No. 201280056984.4, mailed on Apr. 21, 2015, 2 pages (English Translation Only).
Chinese Office Action received for Chinese Application No. 201280056984.4, mailed on May 4, 2015, 9 pages in English and 7 pages in Chinese.
Office Action received for Chinese Patent Application No. 201280056984.4, mailed on Jun. 20, 2016, 4 pages of English translation and 3 pages of Chinese Office Action.

* cited by examiner

NAVIGATION SYSTEM AND METHOD WITH LOCATION-AWARE ACCURACY AND/OR POWER ADJUSTMENTS

FIELD

The present disclosure relates to navigation systems and methods, and more particularly, relates to a navigation system and method with location-aware accuracy and/or power adjustments.

BACKGROUND

Navigation systems, such as satellite navigation systems, are commonly used by a variety of different users to determine a general location of the user, to determine a route to a destination location, and/or to navigate to that destination location. One example of a navigation system uses a global navigation satellite system (GNSS), such as the Global Positioning System (GPS), and receives satellite signals broadcast from multiple satellites. Navigation systems often include navigation system receivers carried by a user or a vehicle as the user or Vehicle moves. The navigation system receivers receive navigation signals, process the navigation signals to obtain navigation data (e.g., estimated positions of the receiver), and provide navigation data and/or navigation instruction based on the navigation data. Navigation instruction may be provided by displaying the navigation route with an approximate receiver (i.e., user or vehicle) location on a map using a map application.

Achieving desired accuracy with navigation systems has been an ongoing challenge. The navigation data may include errors caused by various effects such as the effect of the atmosphere on the satellite signals, clock accuracy, and multipath errors caused by reflected satellite signals. Thus, the estimated positions of the navigation receiver, as determined from processing satellite signals and data, may vary from the actual absolute positions of the receiver as the receiver moves. The resulting track determined for the receiver from this noisy position stream can vary erratically and may appear to jitter when displayed on a map grid (e.g., streets and highways) even though the user or vehicle carrying the receiver may be traveling in a straight line. To improve performance and user experience, map applications used to display the approximate receiver location often correct or snap the approximate receiver location to the map grid based on the proximity of the estimated current position to the map grid.

Although snapping the approximate receiver location to a map grid may improve user experience, problems may occur when the discrepancy between the estimated position and the actual absolute position of the receiver is substantial (i.e., as a result of lower accuracy). When a user or vehicle approaches a waypoint, for example, and deviates from the established navigation route (e.g., takes a wrong turn), the lower accuracy may cause the system to have a substantial latency between the actual deviation from the route and the identification or detection of the deviation by the receiver. In particular, the map application may assume that the deviation of the estimated position from the navigation route is a result of an inaccurate position measurement and thus snap the receiver location to the grid along the navigation route as if the receiver is following the navigation route. The deviation may eventually be identified but the substantial delay in identifying the deviation caused by the lower accuracy often prevents the user or vehicle from making a correction in a timely manner, resulting in the calculation of a new navigation route or hindering the user experience.

Navigation system receivers may use various signal and data processing techniques to improve the accuracy of the estimated position of the receiver relative to an actual absolute position of the receiver. Signal and data processing techniques that improve accuracy, however, may also increase power consumption in the navigation system receiver. To operate with lower power consumption, which may be desirable in certain applications, may require a lower accuracy and may result in the problems identified above.

SUMMARY

Consistent with one embodiment, a method includes: obtaining navigation data representative of at least an estimated current position of a navigation system receiver; and changing at least one accuracy and/or power setting of the navigation system receiver in response to the estimated current position.

Consistent with another embodiment, a method includes: obtaining user destination data representative of a destination location; obtaining navigation data representative of at least an estimated current position of a navigation system receiver; determining, in the navigation system receiver, a navigation route in response to the destination location and the estimated current position; and changing at least one accuracy setting of the navigation system receiver in response to a characteristic of the determined navigation route and/or the estimated current position.

Consistent with a further embodiment, a navigation system receiver includes: a satellite signal receiver configured to receive a plurality of satellite signals broadcast from a plurality of satellites, respectively; a tracker configured to process the satellite signals to obtain measurement data representative of measurements relative to the satellites, respectively; a navigator configured to process the measurement data to obtain position, velocity and time (PVT) data representative of an estimated position, velocity and time of the navigation system receiver; and an application configured to receive user input, to determine a navigation route, to provide navigation instruction to a user in response to the PVT data, and to cause a change of an accuracy setting in response to a characteristic of the determined navigation route and/or the estimated current position.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
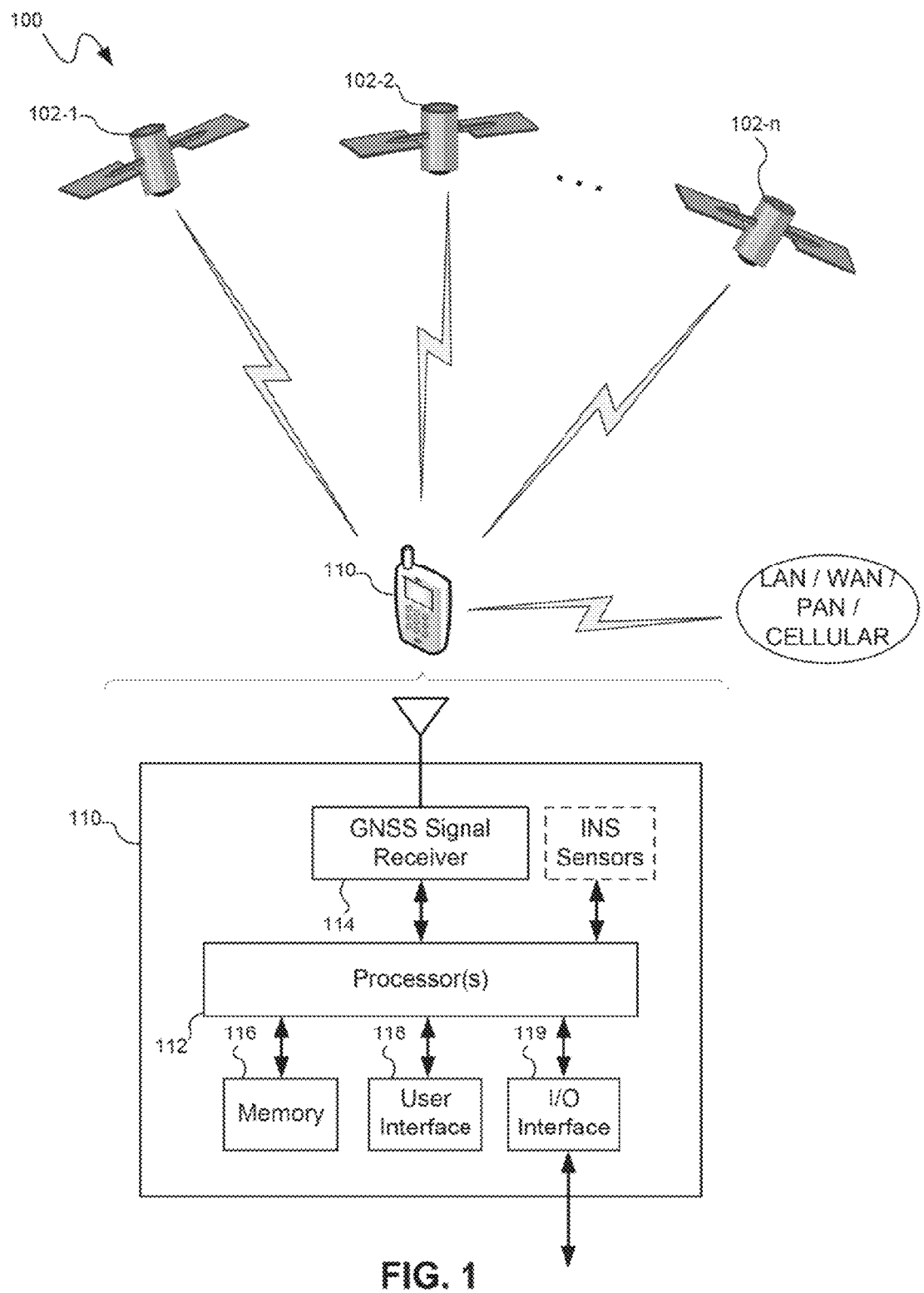
FIG. 1 is a schematic diagram illustrating a satellite-based navigation system receiver with location-aware accuracy and/or power adjustment, consistent with an embodiment of the present disclosure.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

In a navigation system and method, consistent with embodiments of the present disclosure, location-aware adjustments may be made to the accuracy and/or power of the navigation system by changing at least one accuracy and/or power setting of a navigation system receiver in response to at least one characteristic of a navigation route and/or an estimated current position of the receiver. By providing location-aware accuracy and/or power adjustments, the accuracy may be increased when a higher accuracy is desired and may be decreased (with lower power) when a lower accuracy is sufficient based on the receiver location. A higher accuracy setting may be used, for example, when the estimated current position of a navigation system receiver is within the vicinity of a waypoint along the navigation route and a lower accuracy setting may be used at other times to reduce power consumption. Thus, power consumption may be improved with negligible impact on the accuracy and/or accuracy may be improved with negligible impact on the overall power consumption.

As used herein, "estimated current position" refers to the determined or calculated position of a navigation system receiver as defined using known coordinates such as, for example, World Geodetic System (WGS) coordinates (e.g., WGS 84). The estimated current position has some degree of conformance with an actual absolute position of the navigation system receiver but may not be the same as the actual absolute position. As used herein, "accuracy" refers to the degree of conformance between an estimated current position, velocity and time determined by a navigation system receiver and an actual absolute position, velocity and time, and "accuracy setting" refers to a setting, such as a signal or data processing parameter, within a navigation system receiver, which affects the accuracy of the navigation system receiver. As used herein, a "power setting" refers to a setting within a navigation system receiver, which affects the power consumption of the receiver. As used herein, "location-aware adjustment" refers to an adjustment or change (e.g., to an accuracy setting and/or power setting) that is made within a navigation system receiver in response to a particular estimated current position of a navigation system receiver. As used herein, "navigation route" refers to a defined series of points between an estimated current position of a navigation system receiver and a destination location. As used herein, "waypoint" refers to a point along a navigation route where a user or vehicle may change course and includes, without limitation, a junction, intersection, interchange, turn, curve, and rotary or roundabout.

Referring to FIG. 1, location-aware adjustments may be implemented in a navigation system receiver 110 used with a global navigation satellite system (GNSS) 100, such as the Global Positioning System (GPS). Location-aware accuracy and/or power adjustments, consistent with the present disclosure, may also be implemented in navigation system receivers used in other types of navigation systems (both outdoor and indoor) including, without limitation, an inertial navigation system (INS) or WiFi based navigation systems. The GNSS 100 generally includes a plurality of satellites 102-1 to 102-$n$ broadcasting radio frequency (RF) signals including satellite transmission time and position information. The satellite RF signals received from three or more satellites 102-1 to 102-$n$ may be used by the navigation system receiver 110 to obtain navigation data using known GNSS or GPS signal and data processing techniques, as described in greater detail below. Although only three (3) satellites 102-1 to 102-$n$ are shown for purposes of simplicity, the GNSS 100 may include many more satellites (e.g., 24 GPS satellites) orbiting the earth to allow broad coverage. In addition or as an alternative, the navigation system may include other location information sources such as INS sensors and/or local area network (LAN) (e.g., WiFi™ radio) or personal area network (PAN) (e.g., Bluetooth™ or BLE) sensors.

An embodiment of the navigation system receiver 110 receives satellite signals from the three or more satellites 102-1 to 102-$n$ and processes the satellite signals to obtain satellite transmission time and position data. The navigation system receiver 110 processes the satellite time and position data to obtain measurement data representative of measurements relative to the respective satellites 102-1 to 102-$n$ and processes the measurement data to obtain navigation data representative of at least an estimated current position of the receiver 110. In one embodiment, the measurement data includes time delay data and/or range data and the navigation data includes position, velocity and time (PVT) data for the receiver 110, as described in greater detail below. In other embodiments, the navigation system receiver 110 may receive and process other types of RF signals (e.g., Bluetooth™ and/or WiFi™) to provide position data. In further embodiments, the navigation system receiver 110 may provide hybrid navigation, for example, using GNSS and INS data.

The navigation system receiver 110 may further process the navigation data to establish a navigation route to a destination location and to provide instructions to a user for navigating the navigation route based on the estimated current position of the navigation system receiver 110. In some embodiments, the navigation system receiver 110 displays the navigation route on a predefined map with an approximate location of the receiver relative to the map grid and notifies the user when the approximate receiver location deviates from the navigation route.

The navigation system receiver 110 may also adjust or change one or more accuracy and/or power settings in the navigation system receiver 110 in response to one or more characteristics of the determined navigation route and/or the estimated current position. In particular, the navigation system receiver 110 may change the accuracy setting from a lower accuracy setting to a higher accuracy setting at locations along the navigation route where higher accuracy is desired for navigation purposes. According to one example, a location where higher accuracy is desired is within the vicinity of a waypoint (referred to as a higher accuracy waypoint) along the navigation route where judgment is needed to follow the route, as described in greater detail below. In other embodiments, the navigation system receiver 110 may log location data (e.g., in contrast to calculating navigation routes) based on estimated current position with location-aware adjustments to accuracy and/or power settings.

In the illustrated embodiment, the navigation system receiver 110 generally includes one or more processors 112 coupled to a front end satellite signal receiver 114 and coupled to memory 116. The signal receiver 114 receives, samples and processes the satellite signals to obtain the time and position information from the satellite signals. The processor(s) 112 handle(s) data processing to obtain the measurement data and navigation data and to determine navigation routes and navigation instructions. The memory 116 may store the instructions and/or data for processing while the processor(s) 112 execute(s) the instructions to process the data. The memory 116 may also store and retain data, such as the navigation data, navigation routes, and map data, and software such as application software.

The processor(s) 112 may include, without limitation, a central processing unit (CPU), a digital signal processor (DSP), a reduced instruction set computer (RISC), a complex instruction set computer (CISC), or any combination thereof. The navigation system receiver 110 may also include a chipset (not shown) for controlling communications between the processor(s) 112 and one or more of the other components. In one example, the navigation system receiver 110 may be based on an Intel® Architecture system and the processor(s) 112 and chipset may be from a family of Intel® processors and chipsets, such as the Intel® Atom® processor family. In other examples, the navigation system receiver 110 may be based on other processors including, without limitation, Qualcomm® Snapdragon® processors or ARM™ processors. The processor(s) 112 may also include one or more processors as part of one or more application specific integrated circuits (ASICs) or application specific standard product (ASSPs) for handling specific data processing functions or tasks.

The memory 116 may include one or more volatile and/or non-volatile memory devices including, without limitation, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), and universal serial bus (USB) removable memory.

The navigation system receiver 110 may also include a user interface 118 and an input/output (I/O) interface 119. The user interface 118 may include, for example, one or more keys and a display, a touchscreen, or other hardware and/or software elements capable of providing input from a user and output to a user. The I/O interface 119 may include, for example, a wireless interface for connecting to a wireless network or device (e.g., using WiFi™ or Bluetooth™ protocols or cellular network connections), and/or a wired interface for connected to a network or device (e.g., using a USB connection and protocol).

Although the navigation system receiver 110 is shown as a hand-held unit, a navigation system receiver with location-aware accuracy and/or power adjustment may take other forms. For example, a navigation system receiver with location-aware accuracy and/or power adjustment may be worn by to user or may be carried by a vehicle. The navigation system receiver may be a dedicated navigation device or may include another electronic device or system such as, for example, a mobile phone, a watch, a tablet computer, a laptop computer, or a PC, including integrated navigation or location capabilities. The GNSS signal receiver 114 may also be provided as a separate GNSS signal receiver unit, which may be connected to a separate processing unit such as, for example, a general purpose computer programmed to perform the data processing functions. In other embodiments, a navigation system receiver with location-aware accuracy and/or power adjustment may be a non-GNSS receiver that uses one or more non-GNSS navigation or location technologies such as, for example, WiFi, Bluetooth, or INS.

Figure 2:
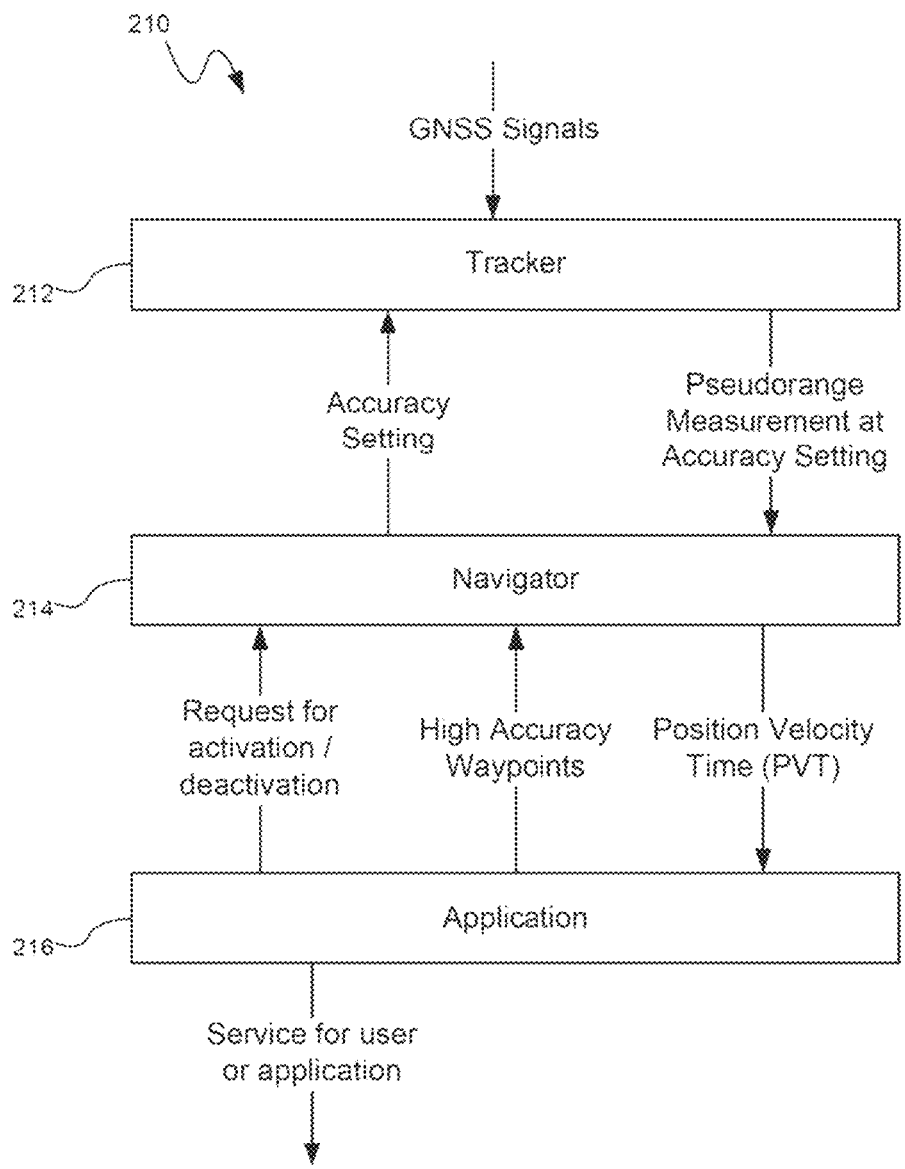
FIG. 2 is functional block diagram illustrating operation of a navigation system receiver with location-aware accuracy and/or power adjustment, consistent with an embodiment of the present disclosure.

Referring to FIG. 2, the data processing functional elements of an embodiment of a navigation system receiver 210 with location-aware accuracy adjustment are described in greater detail. These functional elements may be implemented using any suitable combination of hardware and software. In some embodiments, for example, one or more of the functional elements, or portions of the functional elements, may be implemented using one or more general purpose processors executing software instructions. In other embodiments, one or more of the functional elements or portions of the functional elements may be implemented using one or more ASICs or ASSPs designed specifically to perform the functions.

The navigation system receiver 210 includes a tracker 212 responsible for processing the satellite or GNSS signals to obtain measurement data representative of range measurements relative to the satellites broadcasting the received GNSS signals. In particular, the tracker 212 may calculate delay measurements using the transmission time obtained from the satellite signals and the reception time at the receiver 210. The delay measurements may be used to calculate range measurements such as, for example, pseudorange measurements. As used herein, pseudorange measurements refer to a distance measurement between a satellite and a navigation system receiver, which has not been corrected for errors in synchronization between the transmitter's clock and the receiver's clock.

The navigation system receiver 210 also includes a navigator 214 responsible for processing the measurement data to obtain position, velocity and time (PVT) data representative of an estimated position, velocity and time of the navigation system receiver. In particular, the navigator 214 may calculate an estimated position of the receiver using the satellite position information and the pseudorange measurements for three or more satellites. Four or more satellites may be used to calculate an estimated position with three position dimensions (X, Y, Z) and time, although three satellites may be used to calculate the estimated position with two dimensions (X,Y). The estimated position may be convened to and represented using known World Geodetic System (WGS) coordinates (e.g., WGS 84). In addition, the tracker may provide acceleration/deceleration and axis conversion information (e.g., INS information) to enable hybrid operation of both GNSS and sensor-based positioning.

The navigation system receiver 210 further includes an application 216 responsible for receiving user inputs such as a destination location, for determining a navigation route to the destination location, and for providing navigation instruction to the user based on an estimated current position. The application 216 may also be responsible for activating and deactivating the location-aware accuracy adjustment and may receive user inputs to configure the location-aware accuracy adjustment according to user preferences. The location-aware accuracy adjustment may be configured, for example, by determining how and when accuracy settings are adjusted. When accuracy settings are adjusted within the vicinity of waypoints, for example, the user may configure the high accuracy waypoints by inputting or selecting waypoints or types of waypoints that will trigger the change to a higher accuracy settings. The user may also configure the sensitivity of the location-aware accuracy adjustment, for example, by configuring the predefined distance from a higher accuracy waypoint at which the accuracy adjustment is made. The user may further select different levels of accuracy and/or different levels of power consumption that will result in different levels of accuracy. In other embodiments, the higher accuracy waypoints and accuracy settings are configured by default or automatically by the application 216.

In some embodiments, the application 216 may include a map application that displays the navigation route and an approximate receiver location (e.g., as determined from the PVT data) on a predefined map. The application 216 may determine a navigation route, for example, by identifying points on the map grid between the estimated current position and the destination location input by the user. The approximate receiver location may be displayed on the map with the navigation route, for example, by snapping the approximate receiver location to the map grid. If the estimated current position of the receiver is within a predefined distance of a location on the map grid, for example, the application 216 may assume that the receiver is at that location on the map grid and may display the receiver (i.e., the user or vehicle) at that map grip location. The application 216 may provide navigation instruction to the user, for example, by notifying the user of waypoints along the navigation route and by notifying the user when the approximate receiver location on the map grid deviates from the navigation route. In other embodiments, the application 216 may provide navigation instruction to other applications, systems or devices (e.g., in a navigation-guided vehicle).

When the location-aware accuracy adjustment is activated, the application 216 may determine when the accuracy should be adjusted and may initiate the change to a different accuracy setting. The application 216 may determine, for example, when the estimated current position is within a predefined distance from a high accuracy waypoint along the navigation route and may cause the navigator 214 and/or the tracker 212 to change an accuracy setting accordingly. Changing the accuracy setting may include one or more changes in the signal and/or data processing performed by the navigator 214 and/or tracker 212, which result in changes in the accuracy of the PVT data.

Accuracy of a GNSS or GPS navigation system may be measured or quantified using known GNSS or GPS position accuracy measures such as, for example, using a distance root mean squared (DRMS) value and/or a dilution of precision (DOP) value. A higher accuracy setting, for example, produces a lower DRMS accuracy measurement and as lower DOP accuracy measurement. A higher accuracy setting also generally results in higher power consumption.

The accuracy and/or power setting may include, for example, a number of satellites used to obtain navigation data and/or a sampling rate of the satellite signals. Increasing the number of satellites and the sampling rate generally increases the accuracy. The accuracy setting and/or power may also include signal quality parameters (e.g., signal strength, SNR, and CINR) such that processing the signals with a higher quality (e.g., higher signal strength or SNR) increases accuracy. The accuracy and/or power setting may further include accuracy parameters (e.g., DOP or DRMS) such that processing GNSS signals and/or measurement data with lower DOP or DRMS measurements increases the accuracy. The accuracy and/or power setting may also include a data rate of the reported PVT data such that providing the PVT data at a higher rate increases the accuracy. The accuracy and/or power setting may also generally include a level of data processing and any other signal or data processing parameters that affect the accuracy and/or power consumption of the navigation system receiver 210. The accuracy and/or power setting may further include activation and deactivation of an INS setting (e.g., a hybrid INS/GNSS mode where a lower sampling rate is used) or substitution of GNSS positioning with other RF positioning such as navigation based on WiFi™ or Bluetooth™. The accuracy and/or power settings may be defined, for example, by a service-level agreement (SLA) between a user of the navigation system and the provider of the navigation system.

Figures 3A, 3B:
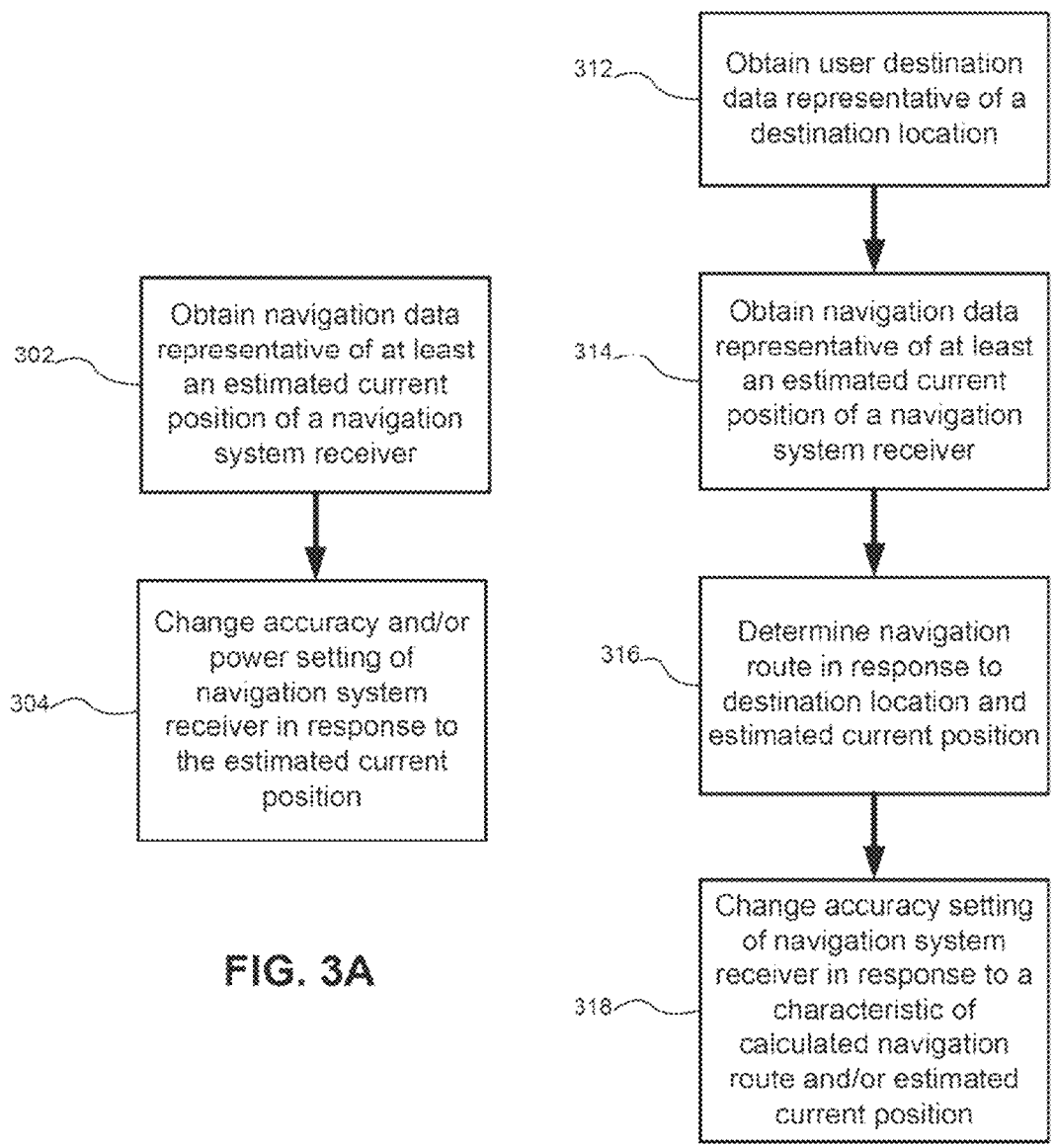
FIGS. 3A and 3B are flow charts illustrating methods using general location-aware accuracy and/or power adjustment, consistent with an embodiment of the present disclosure.

FIG. 3A illustrates a method of navigation or location logging with general location-aware accuracy and/or power adjustment, consistent with an embodiment of the present disclosure. According to this method, navigation data representative of at least an estimated current position of the navigation system receiver is obtained 302. The navigation data may be obtained, for example, by processing satellite signals and measurement data to obtain the PVT data using known techniques as described above. An accuracy and/or power setting of the navigation system receiver may be changed 304 in response to the estimated current position of the navigation system receiver. The accuracy setting may be changed to a higher accuracy setting, for example, by adjusting the signal and/or data processing to provide higher accuracy when the navigation system receiver reaches locations along the navigation route where higher accuracy is desired. The power setting may be changed to a lower power setting, for example, by adjusting the signals and/or data processing to require lower power consumptions (e.g., a lower sampling rate).

FIG. 3B illustrates a navigation method with general location-aware accuracy adjustment, consistent with an embodiment of the present disclosure. According to this navigation method, user destination data representative of a destination location is obtained 312. The user destination data may be obtained, for example, by receiving user input from the user interface of a navigation system receiver and may be in the form of an address or selected location. Obtaining the destination data may also include converting the user input address or selected location into a position using the same coordinate system (e.g., WGS 84) used to define the position of the receiver. Navigation data representative of at least an estimated current position of the navigation system receiver is also obtained 314. The navigation data may be obtained, for example, by processing satellite signals and measurement data to obtain the PVT data using known techniques as described above.

A navigation route may then be determined 316 in response to the destination location and the estimated current position of the navigation receiver. The navigation route may be determined, for example, by identifying points defined on a map grid between the estimated current position and the destination location using known techniques. When multiple navigation routes are possible, a navigation route may be selected, for example, based on the shortest distance or estimated travel time between a start location and the destination location and/or between the estimated current position and the destination location. Higher and lower accuracy locations may be identified along the calculated or selected route. An accuracy setting of the navigation system receiver may be changed 318 in response to a characteristic of the navigation route and/or the estimated current position of the navigation system receiver. The accuracy setting may be changed to a higher accuracy setting, for example, by adjusting the signal and/or data processing to provide higher accuracy when the navigation system receiver reaches locations along the navigation route where higher accuracy is desired.

Figure 4:
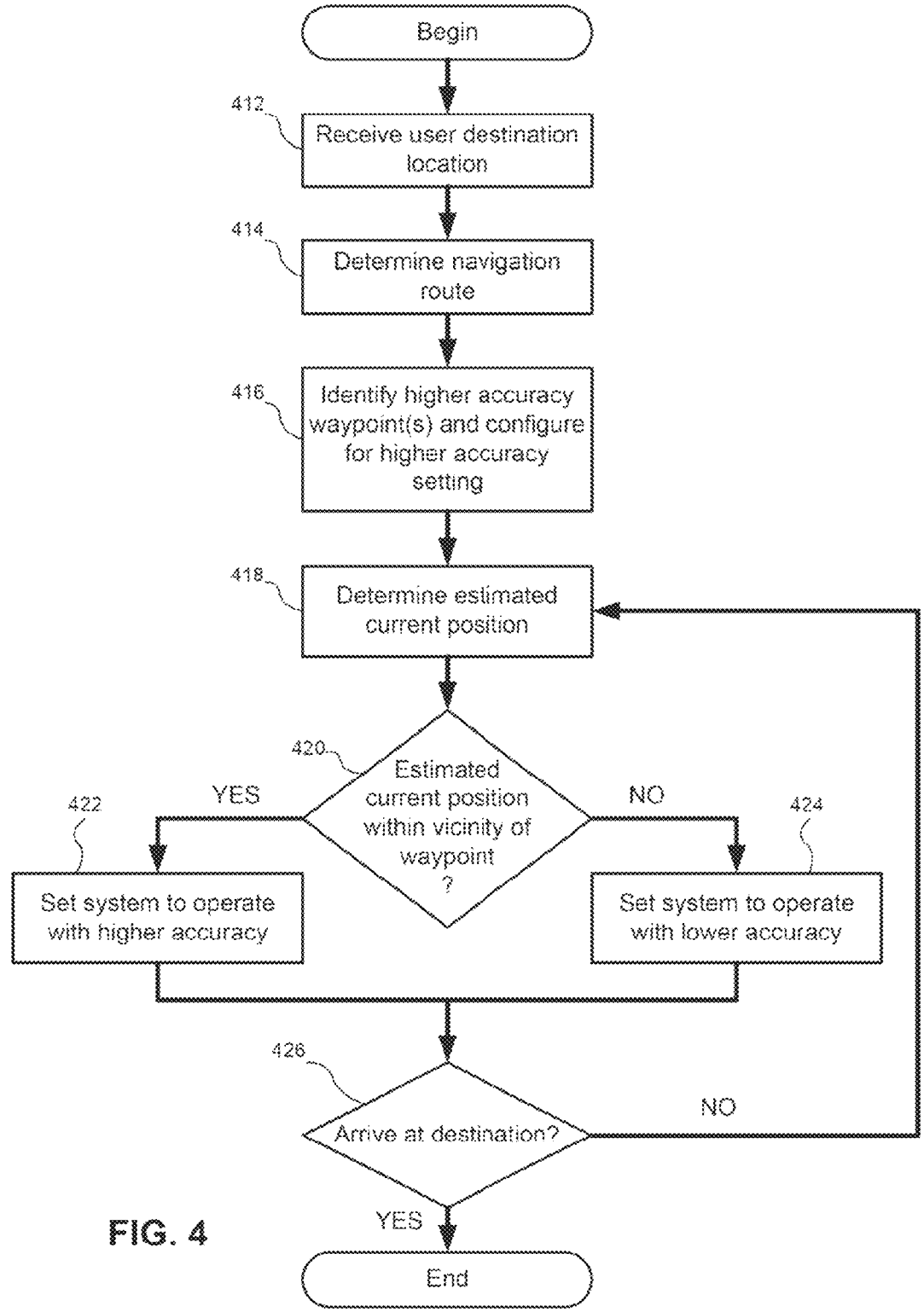
FIG. 4 is a flow chart illustrating a navigation method using waypoint-specific location-aware accuracy and/or power adjustment, consistent with another embodiment of the present disclosure.

FIG. 4 illustrates a navigation method with waypoint-specific location-aware accuracy adjustment, consistent with embodiments of the present disclosure. According to this navigation method, the user destination location is received 412 (e.g., from the user input) and the navigation route is determined 414. Certain waypoints along the navigation route may then be identified and configured 416 for a higher accuracy setting. As the navigation system receiver moves, the estimated current position of the receiver is determined 418, for example, by processing the GNSS signals and measurement data to produce PVT data. If the estimated current position is determined 420 to be within the vicinity (e.g., within a predefined range or distance) of a higher accuracy waypoint, the navigation system is set 422 to operate with higher accuracy. If the estimated current position is determined 420 not to be within the vicinity of a higher accuracy waypoint, the navigation system is set 424 to operate with a lower accuracy. The navigation method continues to determine 418 the estimated current position and to determine 420 if the estimated current position is within the vicinity of a higher accuracy waypoint, until the navigation system receiver arrives 426 at the destination location.

Figure 5A:
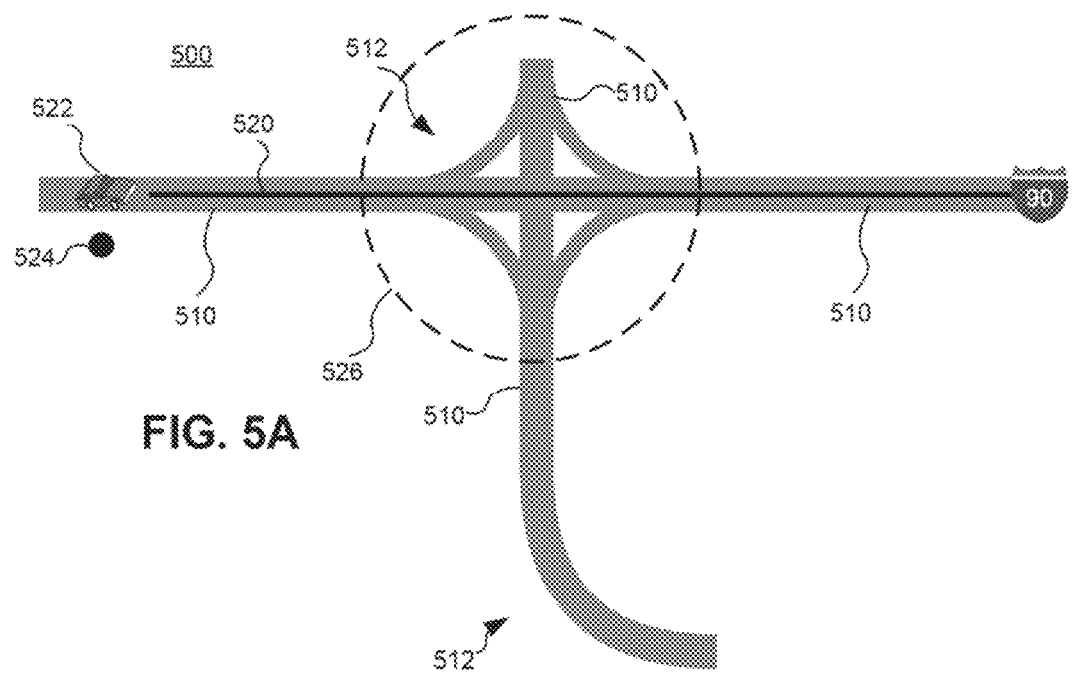
FIGS. 5A-5D are diagrams of maps illustrating one way in which the navigation system and method with location-aware accuracy and/or power adjustment, consistent with embodiments of the present disclosure, may improve performance.

FIGS. 5A-5D illustrate an example of a map 500 that may be displayed by a navigation system and method, consistent with embodiments of the present disclosure. The illustrated example of the map 500 includes a map grid 510 (e.g., streets and highways), waypoints 512 on the map grid 510, a navigation route 520 along the map grid 510, and a vehicle 522 representing the approximate receiver location on the map grid 510. As shown in FIG. 5A, the vehicle 522 representing the navigation system receiver may be displayed on the map grid 510 (i.e., snapped to the grid) at an approximate receiver location when an estimated current position 524 of the navigation system receiver is proximate that location, which is based on an assumption that the actual position of the receiver is on the grid. As long as the navigation system receiver is traveling in a straight line on the map grid, performance of the navigation system is not likely to be affected by any discrepancies (i.e., due to lower accuracy) between the actual position of the navigation system receiver and the approximate receiver location as represented by the vehicle 522 snapped to the grid 510.

Figure 5B:
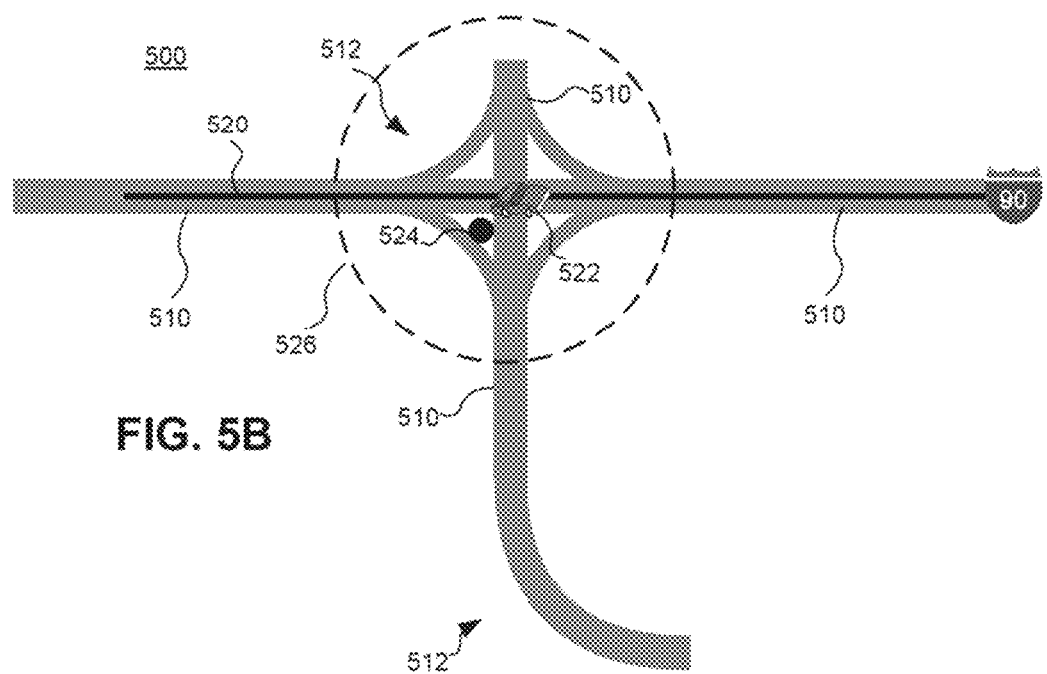

When the lower accuracy setting is used and the receiver travels past a waypoint, as shown in FIG. 5B, the vehicle 522 may continue to be snapped to an approximate location along the route 520 on the grid 510 based on an estimated current position 524 proximate that location on the grid 510 even though the vehicle may have actually changed direction at the waypoint 512. At the lower accuracy setting, therefore, the navigation system may have a substantial latency between the actual deviation from the route 520 and the identification of the deviation by the navigation system.

Figure 5C:
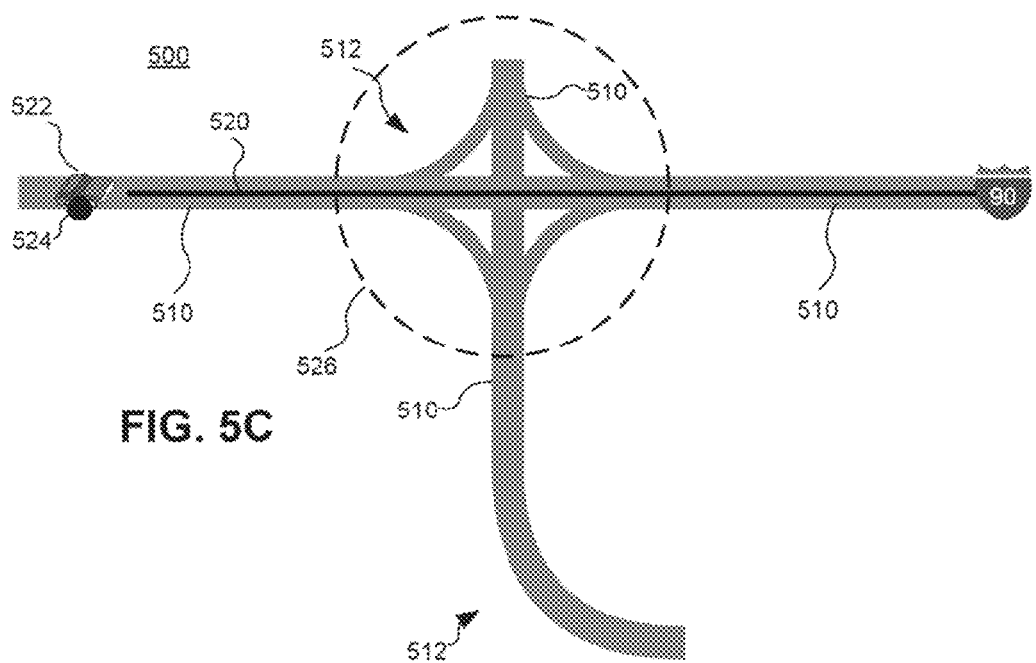
Figure 5D:
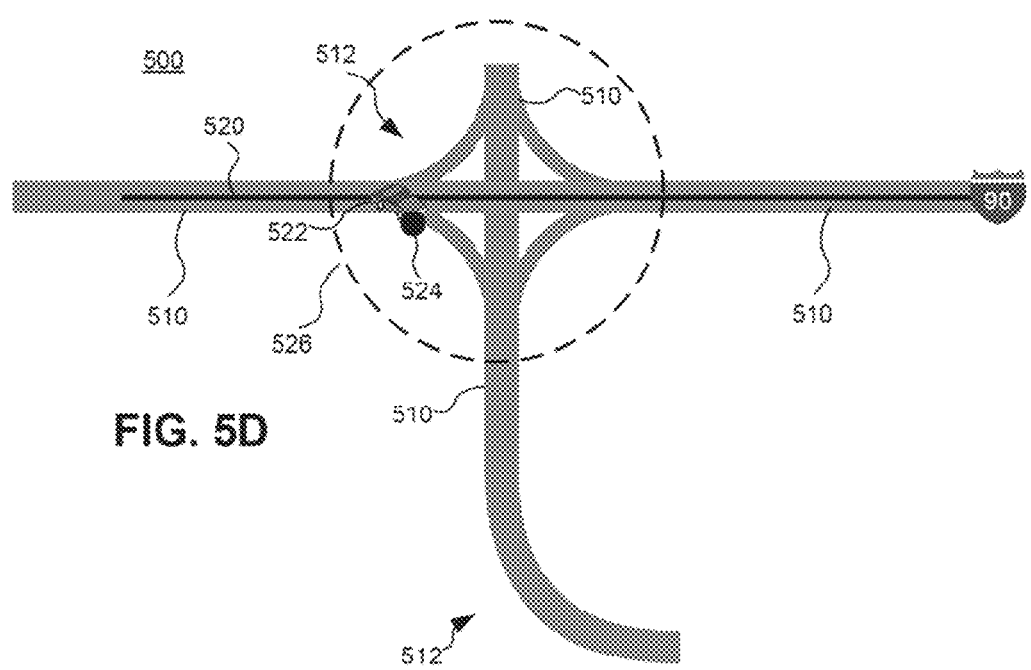

The navigation system and method with location-aware accuracy adjustments may prevent or allow more timely correction of such deviations by using a higher accuracy setting within a predefined distance 526 of the waypoint 512 and enables a user interface which is more consistent with the actual location of the person/vehicle, thus providing a better user experience. As shown in FIGS. 5C and 5D, the higher accuracy setting results in a closer conformance between the estimated current position 524 of the receiver and the actual position of the receiver on the grid 510. Thus, the approximate receiver location as represented by the vehicle 522 is more likely to be snapped to the grid 510 closer to the actual position of the receiver, and the navigation system is able to identify a deviation from the navigation route 520 in a more timely manner. If a driver fails to follow a navigation instruction to stay to the right and take an exit off of a highway, for example, the higher accuracy setting used when the navigation system receiver reaches such a location should allow the navigation system to identify the location in the wrong lane and notify the driver accordingly.

Accordingly, a navigation system and method with location-aware accuracy adjustment may be used to prevent or correct deviation from a navigation route by a user or vehicle carrying the navigation system receiver while allowing lower power consumption.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
    obtaining navigation data representative of at least an estimated current position of a navigation system receiver relative to a navigation route, the navigation route including one or more predetermined directions to arrive from the estimated current position to a destination location; and changing at least one of: signal processing or data processing in the navigation system receiver to provide a high accuracy setting in response to the estimated current position being within a predetermined distance of a high accuracy waypoint, the high accuracy waypoint representing a fixed geographic location along the navigation route and being determined based upon the estimated current position and a destination location, wherein the high accuracy setting corresponds to a high power draw setting of the navigation system receiver; and changing the at least one of: signal processing or data processing in the navigation receiver to provide a low accuracy setting in response to the estimated current position is travelling along a straight line relative to the navigation route, wherein the low accuracy setting corresponds to a low power draw setting of the navigation receiver.

2. The method of claim 1 further comprising:
obtaining user destination data representative of the destination location; and
determining, in the navigation system receiver, the navigation route in response to the destination location.

3. The method of claim 1, wherein the navigation data includes position, velocity and time (PVT) data representative of estimated position, velocity and time, and wherein position is defined using World Geodetic System (WGS) coordinates.

4. The method of claim 2 wherein changing the accuracy setting of the navigation system receiver comprises:
identifying the high accuracy waypoint along the navigation route;
determining if the estimated current position is within the predetermined distance of the high accuracy waypoint;
applying a first accuracy setting if the estimated current position is within the predetermined distance from the high accuracy waypoint; and
applying a second accuracy setting if the estimated current position is not within the predetermined distance from the high accuracy waypoint, wherein the first accuracy setting provides higher accuracy navigation data than the second accuracy setting.

5. The method of claim 4, wherein the navigation data includes position, velocity and time (PVT) data representative of estimated position, velocity and time, and wherein the PVT data is provided at a higher rate for the first accuracy setting than for the second accuracy setting.

6. The method of claim 4, wherein a distance root mean square (DRMS) accuracy measurement is lower for the first accuracy setting than for the second accuracy setting.

7. The method of claim 4, wherein a dilution of precision (DOP) accuracy measurement is lower for the first accuracy setting than for the second accuracy setting.

8. The method of claim 4, wherein the second accuracy setting requires lower power consumption in the navigation system receiver than the first accuracy setting.

9. The method of claim 2 further comprising obtaining map data representative of a predefined map, wherein the navigation route is calculated along the predefined map, and wherein the high accuracy waypoints are identified on the predefined map.

10. The method of claim 1, wherein obtaining navigation data comprises:
receiving a plurality of global navigation satellite system (GNSS) signals in the navigation system receiver, wherein the GNSS signals include at least a satellite transmission time and position;
processing the GNSS signals to determine pseudorange measurements;
processing the pseudorange measurements to determine position, velocity and time (PVT) data; and
providing the PVT data to an application.

11. The method of claim 10, wherein changing the accuracy setting includes changing a number of GNSS signals that are processed to determine pseudorange measurements.

12. The method of claim 10, wherein changing the accuracy setting includes changing a sampling rate of the GNSS signals.

13. The method of claim 10, wherein changing the accuracy setting includes changing a rate of reporting the PVT data to the application.

14. The method of claim 10, wherein changing the accuracy setting include changing signal quality parameters.

15. The method of claim 10, wherein changing the accuracy setting include processing the GNSS signals and/or pseudorange measurements with different accuracy parameters.

16. A navigation system receiver comprising:
a satellite signal receiver to receive a plurality of satellite signals broadcast from a plurality of satellites, respectively;
a tracker to process the satellite signals to obtain measurement data representative of measurements relative to the satellites, respectively;
a navigator to process the measurement data to obtain position, velocity and time (PVT) data representative of an estimated current position, velocity and time of the navigation system receiver; and
a processor to:
obtain navigation data representative of at least an estimated current position of the navigation system receiver relative to a navigation route, the navigation route including one or more predetermined directions to arrive from the estimated current position to a destination location;
change at least one of: signal processing or data processing in the navigation system receiver to a high accuracy setting in response to provide the estimated current position being within a predetermined distance of a high accuracy waypoint, the high accuracy waypoint representing a fixed geographic location along the navigation route and being determined based upon the estimated current position and a destination location, wherein the high accuracy setting corresponds to a high power draw setting of the navigation system receiver; and
change the least one of: signal processing or data processing in the navigation receiver to a low accuracy setting in response to provide the estimated current position is travelling along a straight line relative to the navigation route, wherein the low accuracy setting corresponds to a low power draw setting of the navigation receiver.

17. The apparatus of claim 16, wherein the application is configured to identify the high accuracy waypoint along the navigation route, to determine if the estimated current position is within the predetermined distance of the high accuracy waypoint, and to cause a first accuracy setting to be applied if the estimated current position is within the predetermined distance from the high accuracy waypoint and cause a second accuracy setting to be applied if the estimated current position is not within the predetermined distance from the high accuracy waypoint, wherein the first accuracy setting provides higher accuracy navigation data than the second accuracy setting.

18. The apparatus of claim 16, wherein the satellite signal receiver is configured to receive a plurality of global navigation satellite system (GNSS) signals including at least a satellite transmission time and position data, wherein the tracker is configured to process the satellite transmission time and position data to determine pseudorange measurements, and wherein the navigator is configured to process the pseudorange measurements to determine position, velocity and time (PVT) data.

19. The apparatus of claim 16, wherein the application is configured to cause a change in signal and data processing to change the accuracy setting.

20. One or more tangible non-transitory computer-readable memories including instructions stored thereon which, when executed by one or more processors, cause the computer system to perform operations comprising:
  obtain navigation data representative of at least an estimated current position of a navigation system receiver relative to a navigation route, the navigation route including one or more predetermined directions to arrive from the estimated current position to a destination location;
  change at least one of: signal processing or data processing in the navigation system receiver to a high accuracy setting in response to provide the estimated current position being within a predetermined distance of a high accuracy waypoint, the high accuracy waypoint representing a fixed geographic location along the navigation route and being determined based upon the estimated current position and a destination location, wherein the high accuracy setting corresponds to a high power draw setting of the navigation system receiver; and
  change the least one of: signal processing or data processing in the navigation receiver to a low accuracy setting in response to provide the estimated current position is travelling along a straight line relative to the navigation route, wherein the low accuracy setting corresponds to a low power draw setting of the navigation receiver.

21. The one or more tangible non-transitory computer-readable memories of claim 20, wherein instructions stored thereon which, when executed by one or more processors, cause the computer system to perform operations comprising:
  obtaining user destination data representative of the destination location; and
  determining, in the navigation system receiver, a navigation route in response to the destination location.

22. The one or more tangible non-transitory computer-readable memories of claim 21, wherein changing the accuracy setting of the navigation system receiver comprises:
  identifying the high accuracy waypoint along the calculated navigation route;
  determining if the estimated current position is within the predetermined distance from the high accuracy waypoint;
  applying a first accuracy setting if the estimated current position is within the predetermined distance from the high accuracy waypoint; and
  applying a second accuracy setting if the estimated current position is not within the predetermined distance from the high accuracy waypoint, wherein the first accuracy setting provides higher accuracy navigation data than the second accuracy setting.

* * * * *